United States Patent [19]
Ravicchio

[11] 3,964,662
[45] June 22, 1976

[54] SEALING APPARATUS
[75] Inventor: Donald P. Ravicchio, Appolo, Pa.
[73] Assignee: Carrier Corporation, Syracuse, N.Y.
[22] Filed: Feb. 3, 1975
[21] Appl. No.: 546,576

[52] U.S. Cl. ................................ 277/58; 277/187; 415/108
[51] Int. Cl.² .......................................... F16J 9/00
[58] Field of Search ............... 277/166, 58, 187, 25, 277/70, 71 R; 415/108, 170 A

[56] References Cited
UNITED STATES PATENTS

| | | | |
|---|---|---|---|
| 2,161,003 | 6/1939 | Berman | 277/166 |
| 2,660,487 | 11/1953 | Wilfley | 277/25 X |
| 3,647,226 | 3/1972 | Middelkoop | 277/187 |

Primary Examiner—Samuel B. Rothberg
Attorney, Agent, or Firm—J. Raymond Curtin; Thomas J. Wall

[57] ABSTRACT

A seal suitable for use in a barrel-type rotary machine having an inner casing mounted within an outer casing to provide a chamber therebetween which is pressurized by exposing the chamber to high pressure fluids processed in the machine. One end of the chamber is substantially enclosed by a pressure responsive resilient member. One end of the member is secured to the inner casing and the opposite end thereof arranged to support a sealing element in non-contiguous relation adjacent to the inner wall of the outer casing. As the chamber is pressurized, the resilient member is forced outwardly toward the outer casing to securely seat the sealing element in positive fluid-tight engagement thereagainst.

5 Claims, 1 Drawing Figure

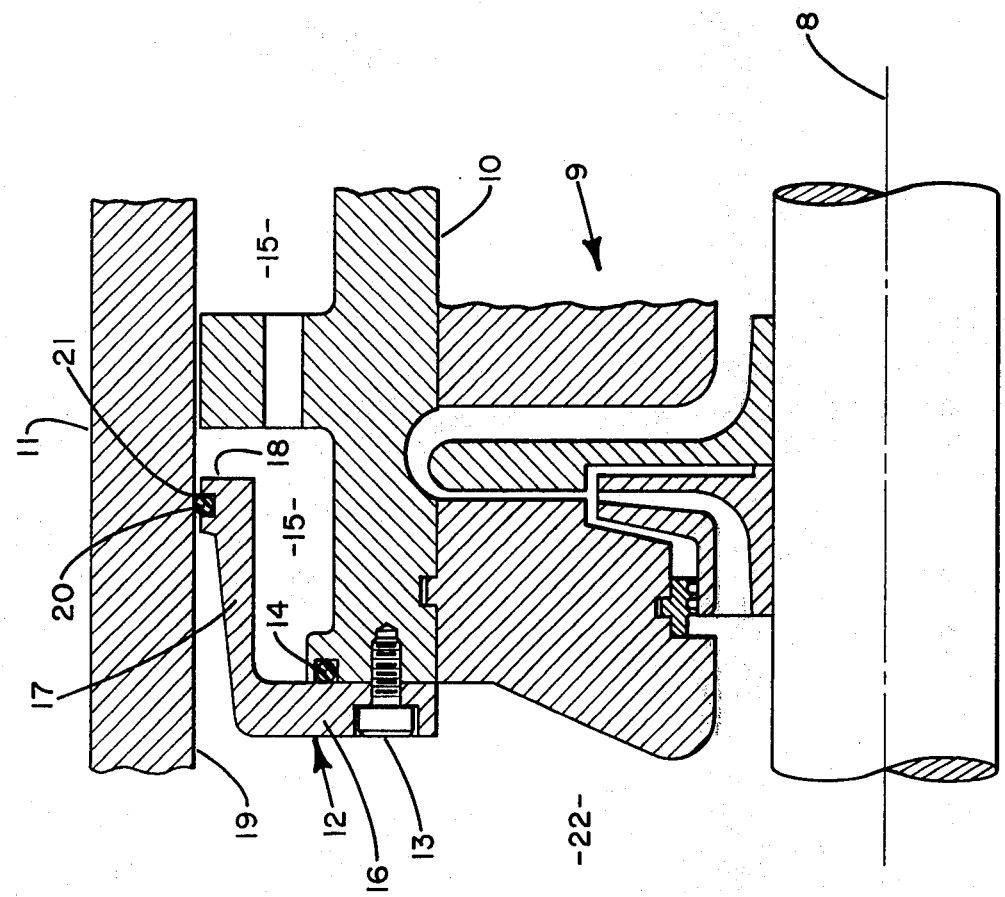

SEALING APPARATUS

BACKGROUND OF THE INVENTION

This invention relates to a pressure responsive sealing assembly for containing pressurized fluids within a region formed between the inner and outer casings of a high pressure rotary-type machine.

A barrel-type machine configuration has been developed suitable for accommodating increasing pressures demanded on rotary-type machines. This concept has been widely employed in the centrifugal compressor art. In a barrel-type compressor, an inner casing is mounted within an outer casing. The outer casing is generally constructed of a single-piece, open-sided cylinder which is well suited to withstand the relatively high pressures involved. The inner casing is divided into two sections that are arranged to part along the axial centerline of the machine shaft. In assembly, the stationary machine components are supported within the inner casing and the casing then closed about the rotor structure. The inner casing assembly is next inserted into the outer casing and the machine enclosed by means of conventional end walls or the like. A chamber is provided between the two casing sections. The low pressure end of the chamber is sealed and high pressure working fluids developed within the machine are allowed to enter the chamber region from the high pressure side of the machine. Pressurizing the chamber in this manner serves to firmly seat the inner assembly within the outer casing and also securely holds the two halves of the inner casing tightly in place. Proper positioning of the casing seal during assembly and maintaining the integrity of the seal under operating loads has long been a problem in the art.

SUMMARY OF THE INVENTION

It is therefore an object of the present invention to improve the pressure seal acting between the inner and outer casings of a barrel-type rotary machine.

It is a further object of the present invention to provide a casing seal for use in a barrel-type compressor which provides for easy and accurate positioning of the seal in assembly.

A still further object of the present invention is to provide a seal between the inner and outer casings of a rotary machine that is capable of delivering a positive sealing pressure between the casings as the operating pressure of the machine is increased.

These and other objects of the present invention are attained in a rotary machine including an inner casing supported within an outer casing to form an annular chamber therebetween that is adapted to contain high pressure working fluids therebetween, a resilient member mounted at one end of the chamber to substantially enclose the chamber, the member being secured at one end within the inner casing with the free end thereof supported adjacent to the outer casing, a sealing element mounted within the free end of the resilient member and being arranged to move into positive sealing contact against the outer casing of the machine as the resilient member is deformed by the high pressure working fluids.

BRIEF DESCRIPTION OF THE DRAWING

For a better understanding of the invention as well as other objects and further features thereof, reference is had to the following detailed description of the invention to be read in connection with the accompanying drawing illustrating a sealing mechanism acting between the inner and outer casings of a barrel-type rotary machine and which embodies the teachings of the present invention.

DESCRIPTION OF THE PREFERRED EMBODIMENT

Referring now to the drawing, there is illustrated a partial sectional view of a barrel-type compressor including an inner casing 10 and an outer casing 11. For the sake of clarity, the various machine components are generally designated 9 in the drawing, however, it should be understood that the inner casing is split horizontally along its axial centerline 8 of the machine and is arranged to support the rotor assembly and the stationary machine components therein. In assembly, the rotor shaft is journaled for rotation in the end walls of the machine and the end walls keyed against movement and sealed against leakage to enclose the pressure vessel.

It has been found that a conventional seal can easily become misaligned or damaged when the inner casing is inserted into the outer casing during assembly. Similarly, when any barrel-type machine is operating under load, the pressure maintained in the chamber between the two casings acts to load the inner casing in compression and the outer casing in tension. As a consequence, the two casings are caused to move radially away from each other thereby reducing the effectiveness of a conventional seal. Furthermore, the machining tolerances that can be maintained between parts become proportionally larger as the physical size of the machine increases. Here again, because of the large tolerances involved, the integrity of the seal is difficult to maintain. As will become apparent from the disclosure below, the sealing arrangement of the present invention overcomes these longstanding difficulties found in the art by providing a sealing arrangement that is easy to assemble, provides for a more positive seal during high pressure operating conditions, and is capable of accommodating a nonuniform growth between the two casings.

In the present embodiment of the invention, a one-piece resilient member 12 is secured to one of the end faces of the inner casing 10 at the low pressure side 22 of the machine by means of a series of cap screws 13. An O-ring 14 is carried in an annular groove formed in the end face of the inner casing and serves to prevent high pressure fluids from passing between the two co-joined members. The resilient member is generally annular in form and arranged to substantially enclose the pressurized chamber 15 formed between the two casings. In cross section, the resilient member has a Z-type configuration made up of a first radial base flange 16 that is secured to the inner casing, a generally axially extended arm 17, and a second relatively smaller flange 18 dependent upon the free end of the arm. The outer periphery of the small flange 18 is arranged to be freely supported adjacent to the inner wall 19 of the outer casing. A second O-ring 20 is carried within annular groove 21 formed in the outer periphery of the flange 18.

In practice, the cross-sectional width of the axially extended arm 17 decreases uniformly from its root at the dependent flange 18 towards the larger base flange 16. The narrow end of the arm permits the arm to respond to the pressure developed within chamber 15.

Under no load conditions, the resilient member 12 is arranged to support the O-ring 20 in non-contiguous relation with the inner wall of the outer casing. As a result, the sealing element 20 can be easily and safely positioned within the machine when the inner casing is being assembled within the outer casing. When the machine is in operation, the chamber is pressurized thus producing a force upon the arm which moves the arm, and thus the seal supported therein, towards the outer casing. As the pressure in the chamber increases, the sealing ring is seated in positive sealing contact against the outer casing.

While this invention has been described with reference to the structure herein disclosed, it is not confined to the details as set forth, and this application is intended to cover any modifications or changes as may come within the scope of the following claims.

What is claimed is:

1. In a rotary machine of the type wherein an inner casing, which substantially encompasses the machine components, is mounted within an outer casing to provide a chamber therebetween for containing a high pressure fluid, the improvements comprising a pressure deformable member responsive to the high pressure fluid introduced into the chamber between the casings, the member having a mounting flange secured in fluid-tight relation with the inner casing, a sealing flange dependent upon the mounting flange positioned adjacent to the inner wall of the outer casing and a resilient arm connecting the two flanges being responsive to the high pressure fluid so as to move the sealing flange from a first position when the chamber is unpressurized to a second position when high pressure fluid is introduced therein, and a sealing element supported within the sealing flange, said element being in noncontiguous relation with the inner wall of the outer casing when the flange is supported in said first position and seated in positive sealing cpntact against the inner wall of the outer casing when the flange is supported in said second position.

2. The apparatus of claim 1 wherein said mounting flange is secured to one end face of the inner casing at the low pressure side of the rotary machine.

3. The apparatus of claim 2 wherein the said arm has a cross sectional width that decreases uniformly from the mounting flange towards the sealing flange.

4. The apparatus of claim 3 further including a second sealing element in fluid-tight relation between the end face of the inner casing and the mounting flange of said pressure deformable member.

5. In a compressor, an inner casing encompassing the stationary and moving component of said compressor, an outer casing encompassing the inner casing to provide an annular chamber therebetween, said chamber being opened at the high pressure side of the compressor to permit fluids processed within the compressor to enter said chamber, and a pressure deformable member secured to one end face of the inner casing at the low pressure side of the compressor with the free end of said member normally supporting a sealing element adjacent to and in noncontiguous relation with the inner wall of the outer casing, the pressure deformable member having a resiliency such that the sealing element is moved from said normal position into positive sealing contact against the outer casing, when high pressure fluid is introduced into said chamber.

* * * * *